United States Patent
Vaughn et al.

(10) Patent No.: US 10,834,027 B2
(45) Date of Patent: Nov. 10, 2020

(54) PROTECTION OF SENSITIVE CHAT DATA

(71) Applicant: McAfee, LLC, Plano, TX (US)

(72) Inventors: Robert L. Vaughn, Portland, OR (US); David M. Durham, Beaverton, OR (US); Cedric Cochin, Portland, OR (US); Jonathan B. King, Forest Grove, OR (US)

(73) Assignee: McAfee, LLC, San Jose, CA (US)

( * ) Notice: Subject to any disclaimer, the term of this patent is extended or adjusted under 35 U.S.C. 154(b) by 78 days.

(21) Appl. No.: 14/752,870

(22) Filed: Jun. 27, 2015

(65) Prior Publication Data
US 2016/0380927 A1     Dec. 29, 2016

(51) Int. Cl.
| H04L 12/58 | (2006.01) |
| G06F 21/62 | (2013.01) |
| H04L 29/06 | (2006.01) |
| H04W 4/12 | (2009.01) |

(52) U.S. Cl.
CPC .......... H04L 51/04 (2013.01); G06F 21/6263 (2013.01); H04L 63/0428 (2013.01); H04W 4/12 (2013.01)

(58) Field of Classification Search
CPC .. H04L 51/04; H04L 63/0428; G06F 21/6263
USPC ....................................................... 709/206
See application file for complete search history.

(56) References Cited

U.S. PATENT DOCUMENTS

| 5,987,610 | A |  | 11/1999 | Franczek et al. |
| 6,073,142 | A |  | 6/2000 | Geiger et al. |
| 6,460,050 | B1 |  | 10/2002 | Pace et al. |
| 7,506,155 | B1 |  | 3/2009 | Stewart et al. |
| 8,458,487 | B1 | * | 6/2013 | Palgon ................ G06F 21/00 380/277 |
| 9,020,824 | B1 | * | 4/2015 | Govil ................ G10L 19/04 704/275 |
| 9,092,777 | B1 | * | 7/2015 | Gaspar ............... G06Q 20/385 |
| 9,191,615 | B1 | * | 11/2015 | Valimaki ............ H04L 12/1813 |
| 9,577,835 | B2 | * | 2/2017 | Aniano ............... G06F 21/6245 |
| 2004/0083092 | A1 | * | 4/2004 | Valles ................ G06F 17/271 704/9 |
| 2004/0128552 | A1 | * | 7/2004 | Toomey ............... G06F 21/57 726/22 |

(Continued)

FOREIGN PATENT DOCUMENTS

WO       2017003581 A1     1/2017

OTHER PUBLICATIONS

International Search Report and Written Opinion in International Application No. PCT/US2016/033848, dated Aug. 24, 2016, 10 pages.

*Primary Examiner* — Nicholas R Taylor
*Assistant Examiner* — Chong G Kim
(74) *Attorney, Agent, or Firm* — Patent Capital Group (57) ABSTRACT

Particular embodiments described herein provide for a system that can be configured to communicate chat session data during a chat session to a first display of a first electronic device, communicate the chat session data during the chat session to a second display of a second electronic device, receive sensitive data during the chat session from the first electronic device, and protect the sensitive data from being displayed on the second display during the chat session without breaking continuity of the chat session.

20 Claims, 8 Drawing Sheets

(56) References Cited

U.S. PATENT DOCUMENTS

| | | | |
|---|---|---|---|
| 2004/0143632 A1* | 7/2004 | McCarty | H04L 12/1813 709/206 |
| 2006/0101508 A1* | 5/2006 | Taylor | G06F 21/32 726/7 |
| 2007/0143475 A1* | 6/2007 | Daigle | G06F 21/6245 709/225 |
| 2007/0156836 A1* | 7/2007 | Kelso | G06Q 10/107 709/207 |
| 2007/0172063 A1* | 7/2007 | Biggs | H04L 51/04 380/255 |
| 2007/0255653 A1* | 11/2007 | Tumminaro | G06Q 20/10 705/39 |
| 2008/0102790 A1* | 5/2008 | Schultz | H04M 3/382 455/410 |
| 2008/0114837 A1* | 5/2008 | Biggs | G06F 17/2765 709/206 |
| 2008/0276315 A1* | 11/2008 | Shuster | H04L 63/1408 726/22 |
| 2008/0288299 A1* | 11/2008 | Schultz | G06Q 30/06 705/4 |
| 2009/0100184 A1* | 4/2009 | Chakra | G06F 21/554 709/229 |
| 2009/0228557 A1* | 9/2009 | Ganz | G06F 17/2765 709/206 |
| 2010/0082481 A1* | 4/2010 | Lin | G06Q 20/042 705/41 |
| 2010/0175136 A1* | 7/2010 | Frumer | G06F 21/31 726/26 |
| 2010/0205667 A1* | 8/2010 | Anderson | G06F 3/013 726/19 |
| 2010/0299139 A1* | 11/2010 | Ferrucci | G06F 16/3329 704/9 |
| 2011/0307355 A1* | 12/2011 | Khalil | G06Q 30/06 705/27.1 |
| 2012/0023323 A1* | 1/2012 | Kent, Jr. | G06Q 10/107 713/150 |
| 2012/0027195 A1* | 2/2012 | Shaffer | H04M 3/42221 379/265.09 |
| 2012/0066120 A1* | 3/2012 | Ringewald | G06Q 20/102 705/40 |
| 2012/0323565 A1* | 12/2012 | Hildreth | H04L 51/12 704/10 |
| 2013/0007037 A1* | 1/2013 | Azzam | G06F 16/3329 707/769 |
| 2013/0024364 A1* | 1/2013 | Shrivastava | G06Q 20/38 705/39 |
| 2013/0129069 A1* | 5/2013 | Peterson | H04M 3/5141 379/265.02 |
| 2013/0160116 A1* | 6/2013 | Martin | H04L 63/1491 726/22 |
| 2013/0166332 A1* | 6/2013 | Hammad | G06Q 40/10 705/5 |
| 2013/0169778 A1* | 7/2013 | Hymel | H04N 7/147 348/77 |
| 2013/0246793 A1 | 9/2013 | McCann | |
| 2013/0268765 A1 | 10/2013 | Kent et al. | |
| 2013/0282814 A1* | 10/2013 | Marcucci | H04W 4/21 709/204 |
| 2013/0282844 A1* | 10/2013 | Logan | H04L 67/02 709/206 |
| 2014/0067375 A1* | 3/2014 | Wooters | G06F 17/28 704/9 |
| 2014/0082523 A1* | 3/2014 | Duquene | G06F 17/30165 715/753 |
| 2014/0101261 A1* | 4/2014 | Wu | G06Q 10/107 709/206 |
| 2014/0164241 A1* | 6/2014 | Neuwirth | G06Q 20/12 705/44 |
| 2014/0189345 A1 | 7/2014 | Gureghian et al. | |
| 2014/0278367 A1* | 9/2014 | Markman | G06F 17/2765 704/9 |
| 2014/0298479 A1* | 10/2014 | Stass | G06F 21/606 726/26 |
| 2014/0316765 A1* | 10/2014 | Fitterer | G06F 17/2775 704/9 |
| 2014/0337238 A1 | 11/2014 | Leighton | |
| 2014/0337527 A1* | 11/2014 | Jain | G06Q 30/0201 709/225 |
| 2014/0358964 A1* | 12/2014 | Woods | G06F 16/3329 707/769 |
| 2015/0163182 A1* | 6/2015 | Chandrasekaran | H04L 51/063 709/204 |
| 2015/0170120 A1* | 6/2015 | Jang | G06Q 20/12 705/39 |
| 2015/0199538 A1* | 7/2015 | Kritt | G06F 21/6245 726/26 |
| 2015/0227759 A1* | 8/2015 | Aniano | G06F 21/6245 726/28 |
| 2015/0269575 A1* | 9/2015 | Narayanan | H04L 12/1822 705/75 |
| 2015/0348001 A1* | 12/2015 | Van Os | G06Q 20/322 705/44 |
| 2015/0350250 A1* | 12/2015 | Brander | H04L 63/20 726/1 |
| 2016/0012037 A1* | 1/2016 | Gandhi | G06F 17/27 704/9 |
| 2016/0018895 A1* | 1/2016 | Sidi | G06F 3/017 715/752 |
| 2016/0050183 A1* | 2/2016 | Biswas | H04L 63/04 726/26 |
| 2016/0063382 A1* | 3/2016 | Allen | G06N 5/04 706/11 |
| 2016/0104476 A1* | 4/2016 | Allen | G10L 25/51 704/243 |
| 2016/0117665 A1* | 4/2016 | Davis | G06Q 20/223 705/39 |
| 2016/0180325 A1* | 6/2016 | Davis | G06Q 20/085 705/44 |
| 2016/0241530 A1* | 8/2016 | Andreev | H04L 51/12 |
| 2016/0285816 A1* | 9/2016 | Schmid | G06Q 30/0631 |
| 2016/0308814 A1* | 10/2016 | Meister | G06Q 10/107 |

\* cited by examiner

PROTECTION OF SENSITIVE CHAT DATA

TECHNICAL FIELD

This disclosure relates in general to the field of information security, and more particularly, to the protection of sensitive chat data.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. Hence, significant administrative challenges remain for protecting computers and computer networks from malicious and inadvertent exploitation by malicious software and devices.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

Figure 1:
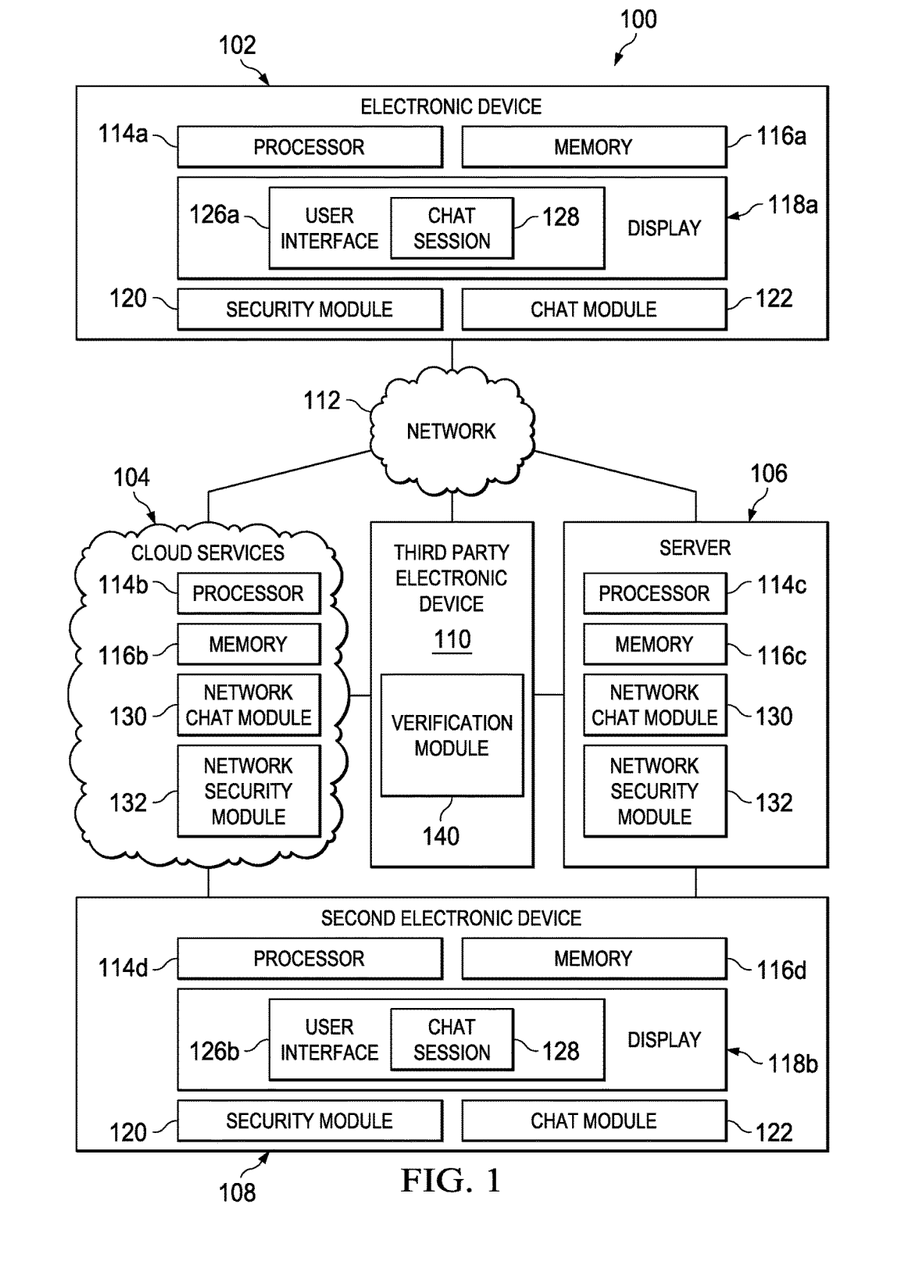
FIG. 1 is a simplified block diagram of a communication system for the protection of sensitive chat data in accordance with an embodiment of the present disclosure.

FIG. 1 is a simplified block diagram of a communication system 100 for the protection of sensitive chat data in accordance with an embodiment of the present disclosure. As illustrated in FIG. 1, an embodiment of communication system 100 can include an electronic device 102, cloud services 104, a server 106, a second electronic device 108, and a third party electronic device 110. Electronic device 102 can include a processor 114a, memory 116a, a display 118a, a security module 120, and a chat module 122. Display 118a can include a user interface 126a. User interface 126a can include a chat session 128. Cloud services 104 can include a processor 114b, memory 116b, a network chat module 130, and a network security module 132. Server 106 can include a processor 114c, memory 116c, network chat module 130, and network security module 132. Second electronic device 108 can include a processor 114d, memory 116d, a display 118b, security module 120, and chat module 122. Display 118b can include a user interface 126b. User interface 126b can include chat session 128. Chat session 128 may be a chat session between a user of electronic device 102 and second electronic device 108. Third party electronic device 110 can include a verification module 140. Electronic device 102, cloud services 104, server 106, second electronic device 108, and third party electronic device 110 can be in communication using network 112.

In example embodiments, communication system 100 can be configured to display chat session data during a chat session on a first display of a first electronic device and on a second display of a second electronic device, receive sensitive data during the chat session from the first electronic device, and protect the sensitive data from being displayed on the second display during the chat session without breaking away from the displayed chat data to maintain continuity of the chat session. Communication system 100 can also be configured to encrypt the sensitive chat data before being displayed on the second electronic device and redirect the sensitive chat data to a secure system for processing (e.g., third party electronic device 110). In a specific example, communication system 100 can be configured to recognize when a credit card number is being entered on a client side, intercept it before being displayed on a vendor side and encrypt or hide the credit card number. Communication system 100 can also indicate to the user that sensitive data is protected and send the sensitive data to a separate secure system for processing if necessary.

Elements of FIG. 1 may be coupled to one another through one or more interfaces employing any suitable connections (wired or wireless), which provide viable pathways for network (e.g., network 112) communications. Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

For purposes of illustrating certain example techniques of communication system 100, it is important to understand the communications that may be traversing the network environment. The following foundational information may be viewed as a basis from which the present disclosure may be properly explained.

The term chat session is primarily used to describe any form of online text conferencing. The chat session is typically synchronous but sometimes can be asynchronous and can include any kind of communication over the Internet that offers a real-time transmission of text messages from sender to receiver. Chat messages are generally short in order to enable other participants to respond quickly. Thereby, a feeling similar to a spoken conversation is created which distinguishes chatting from other text-based online communication forms such as Internet forums and email. The chat session can include point-to-point communications as well as multicast communications from one sender to many receivers and voice and video chat or may be a feature of a web conferencing service.

Chat sessions are becoming more popular as a business to client (B2C) method for managing customer support. Often these chat sessions involve sharing data that may be characterized as "sensitive". Sensitive data can include credit card information, social security numbers, birthdates, gender, etc. and this data needs to be protected. Current existing models for handling sensitive data during a chat session, such as popup windows, are not very user friendly, break the continuity of the chat session, and often can be confusing. What is needed is a system and method of collecting sensitive data in chat sessions that is user friendly and maintains the continuity of the chat session.

A communication system that includes the protection of sensitive chat data, as outlined in FIG. 1 can resolve these issues (and others). Communication system 100 may be configured to recognize when sensitive information or data (e.g., credit card information, social security numbers, birthdates, gender, etc.) is being entered on a client side and intercept the sensitive data before it is displayed to a recipient or vendor. In an embodiment, the sensitive data can be redirect it to a secure system for processing. Communication system 100 can enable a user experience with online purchases where a user or consumer could enter sensitive data directly into a chat window without the worry of the sensitive data being viewed by the recipient. Additionally, once a sensitive word, number or phrase has been identified, business rules/logic can be applied to allow chat or discussion oriented systems to collect sensitive data that would otherwise require a form, popup window, etc. without breaking the continuity of the chat session. For example, the flow of the chat data that is displayed is not broken or the user is not required to open another window or respond to a popup window outside of the chat session.

Turning to the infrastructure of FIG. 1, communication system 100 in accordance with an example embodiment is shown. Generally, communication system 100 can be implemented in any type or topology of networks. Network 112 represents a series of points or nodes of interconnected communication paths for receiving and transmitting packets of information that propagate through communication system 100. Network 112 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic device 102, cloud services 104, server 106, second electronic device 108, and third party electronic device 110 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 100, each of electronic device 102, cloud services 104, server 106, second electronic device 108, and third party electronic device 110 can include memory elements for storing information to be used in the operations outlined herein. Each of electronic device 102, cloud services 104, server 106, second electronic device 108, and third party electronic device 110 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, electronic device 102, cloud services 104, server 106, second electronic device 108, and third party electronic device 110 may include software modules (e.g., security module 120, chat module 122, network chat module 130, and network security module 132) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of electronic device 102, cloud services 104, server 106, second electronic device 108, and third party electronic device 110 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Electronic device 102 and second electronic device 108 can each be a network element and include, for example, desktop computers, laptop computers, mobile devices, personal digital assistants, smartphones, tablets, or other similar devices. Cloud services 104 is configured to provide cloud services to electronic device 102 and second electronic device 108. Cloud services may generally be defined as the use of computing resources that are delivered as a service over a network, such as the Internet. Typically, compute, storage, and network resources are offered in a cloud infrastructure, effectively shifting the workload from a local network to the cloud network. Server 106 can be a network element such as a server or virtual server and can be associated with clients, customers, endpoints, or end users wishing to initiate a communication in communication system 100 via some network (e.g., network 112). The term 'server' is inclusive of devices used to serve the requests of clients and/or perform some computational task on behalf of clients within communication system 100. Although security module 120 is represented in FIG. 1 as being located in electronic device 102 and second electronic device 108, this is for illustrative purposes only. Security module 120 could be combined or separated in any suitable configuration. Furthermore, security module 120 could be integrated with or distributed in another network accessible by electronic device 102 and second electronic device 108.

Figure 2:
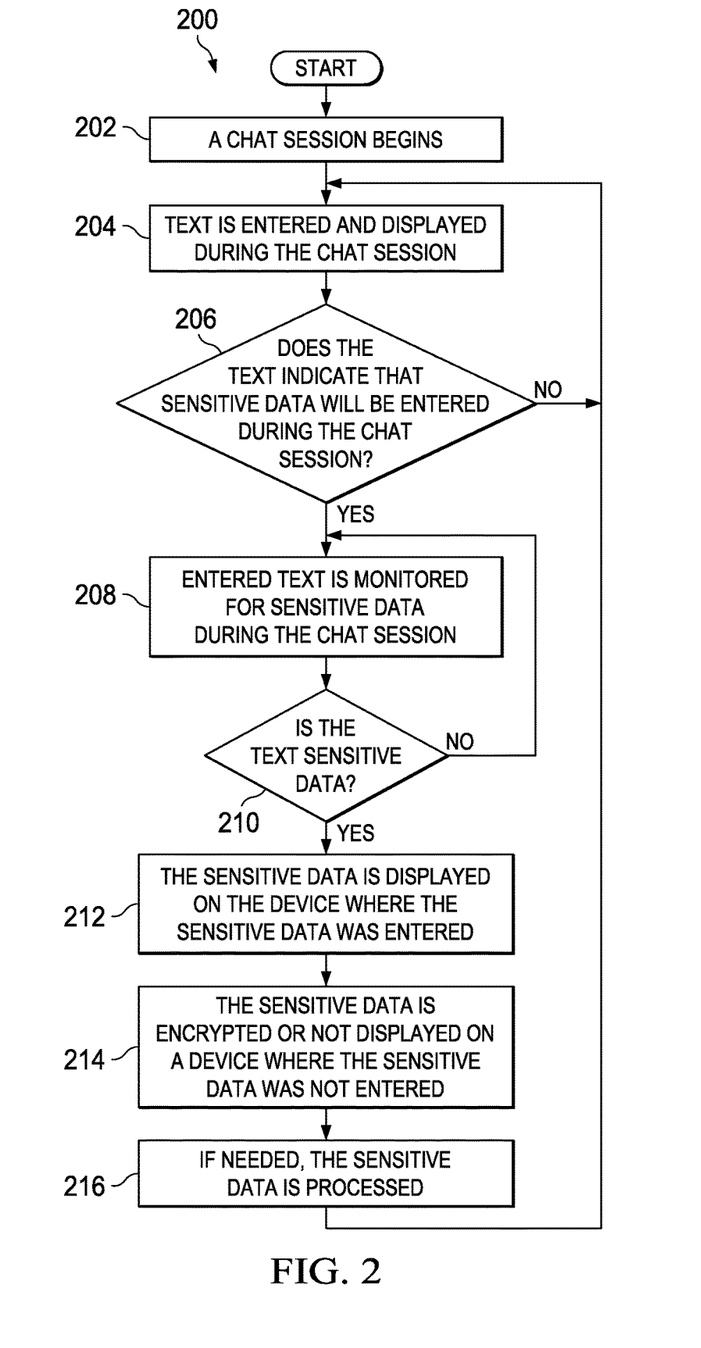
FIG. 2 is a simplified flowchart illustrating potential operations that may be associated with the communication system in accordance with an embodiment.

Turning to FIG. 2, FIG. 2 is an example flowchart illustrating possible operations of a flow 200 that may be associated with the protection of sensitive chat data, in accordance with an embodiment. In an embodiment, one or more operations of flow 200 may be performed by security module 120, chat module 122, network chat module 130, and network security module 132. At 202, a chat session begins. At 204, text is entered and displayed during the chat session. The entered text can be displayed on both display 118a and 118b during chat session 128. At 206, the system determines if the text indicates that sensitive data will be entered during the chat session. If the text does not indicate that sensitive data will be entered during the chat session, then text is entered and displayed during the chat session, as in 204.

If the text indicates that sensitive data will be entered during the chat session, then entered text is monitored for sensitive data during the chat session, as in 208. In an example, any text that is entered during the chat session is monitored for sensitive data and the system does not determine if the text indicates that sensitive data will be entered during the chat session because sensitive data may be entered at any time. At 210, the system determines if the text is sensitive data. If the text is not sensitive data, then entered text is monitored for sensitive data during the chat session, as in 208.

If the text is sensitive data, then the sensitive data is displayed on the device where the sensitive data was entered, as in 212. At 214, the sensitive data is encrypted or not displayed on a device where the sensitive data was not entered. For example, if the sensitive data was entered in chat session 128 using user interface 126a, then the sensitive data would be displayed in the chat session 128 on display 118a. However, because the sensitive data was not entered using user interface 126b, the sensitive data would be encrypted or not displayed in chat session 128 on display 118b. At 216, if needed, the sensitive data is process. For example, the sensitive data may be processed by cloud services 104, server 106, or by third party electronic device 110 using verification module 140.

Figure 3:
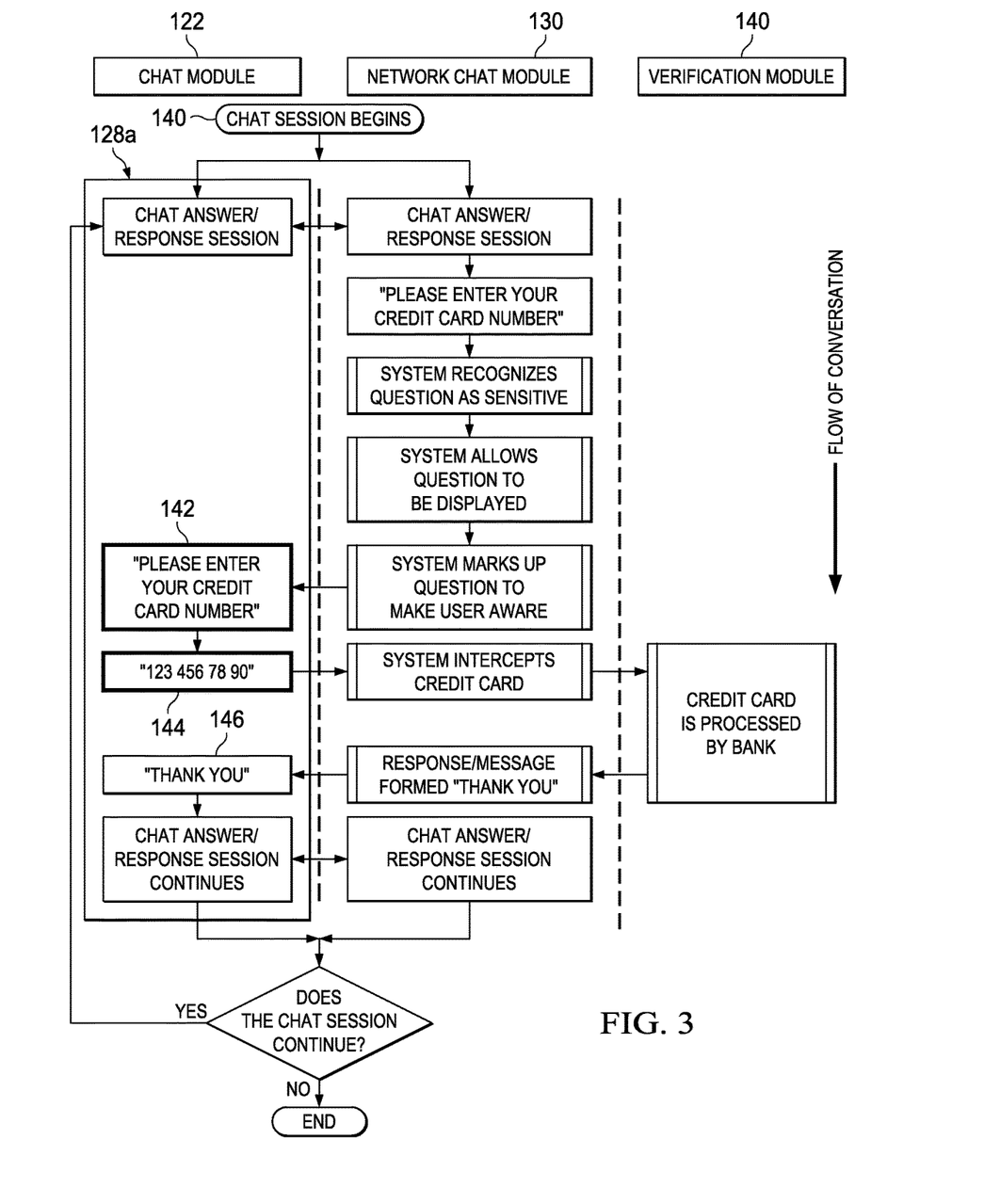
FIG. 3 is a simplified timing flow diagram illustrating potential operations that may be associated with the communication system in accordance with an embodiment.

Turning to FIG. 3, FIG. 3 is an example timing flow diagram illustrating possible operations that may be associated with the protection of sensitive chat data, in accordance with an embodiment. In an embodiment, one or more operations of FIG. 3 may be performed by security module 120, chat module 122, network chat module 130, and network security module 132. As illustrated in FIG. 3, a chat session begins at 140. The chat session may be between a user of electronic device 102 (e.g., a consumer) and a user of second electronic device 108 (e.g., a vendor). Chat module 122 can be configured to process chat data and display text in chat session 128a. For example, during chat session 128a, a request for payment 142 of goods or services related to the chat session may be sent. More specifically, a user may have started a chart session with a vendor to inquire about a new software program the user is interested in purchasing. The user may have decided to purchase the software and the vendor may send a request for payment of the software. For example, the text "Please enter your credit card number" may have been entered by the vendor an dappear on display 118a in chat session 128. In response to the request for payment 142, network chat module 130 can be configured to recognize the request as an indication that sensitive data may be entered during the chat session and network chat module 130 can allow the text to be displayed but mark up or otherwise identify the text to make the user aware of the request and that the request is requesting sensitive data. In response to request for payment 142, sensitive data 144 may be entered. Sensitive data 144 may be a credit card number, bank account number, customer number, or some other type of sensitive data. Network chat module 130 can intercept sensitive data 144 and communicate sensitive data 144 to verification module 140 where sensitive 144 data can be processed. Sensitive data 144 may be displayed only on display 118a where sensitive data 144 was entered and encrypted or not displayed on any other display (e.g., display 118b) where sensitive data 144 was not entered. Once sensitive data 144 has been processed, a response message 146 can be displayed in chat session 128 using chat module 122. This allows the user to enter sensitive data directly into a chat window without the worry of the sensitive data being viewed by the recipient and without breaking the continuity of the chat session. For example, the flow of the displayed chat data is not broken and the user is not required to open another window or respond to a popup window that breaks the flow of the chat session.

Figure 4A:
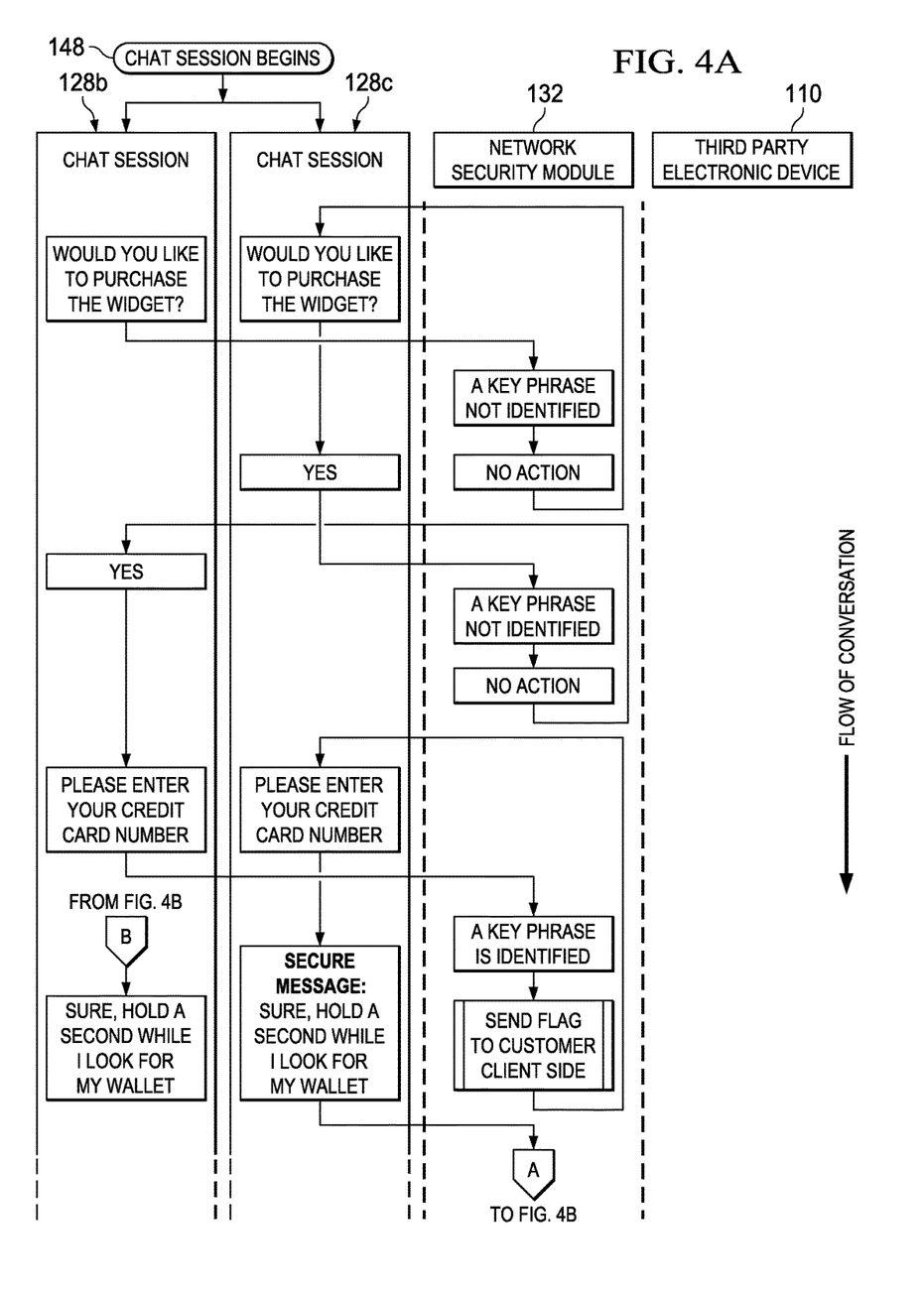
FIG. 4A is a simplified timing flow diagram illustrating potential operations that may be associated with the communication system in accordance with an embodiment.
Figure 4B:
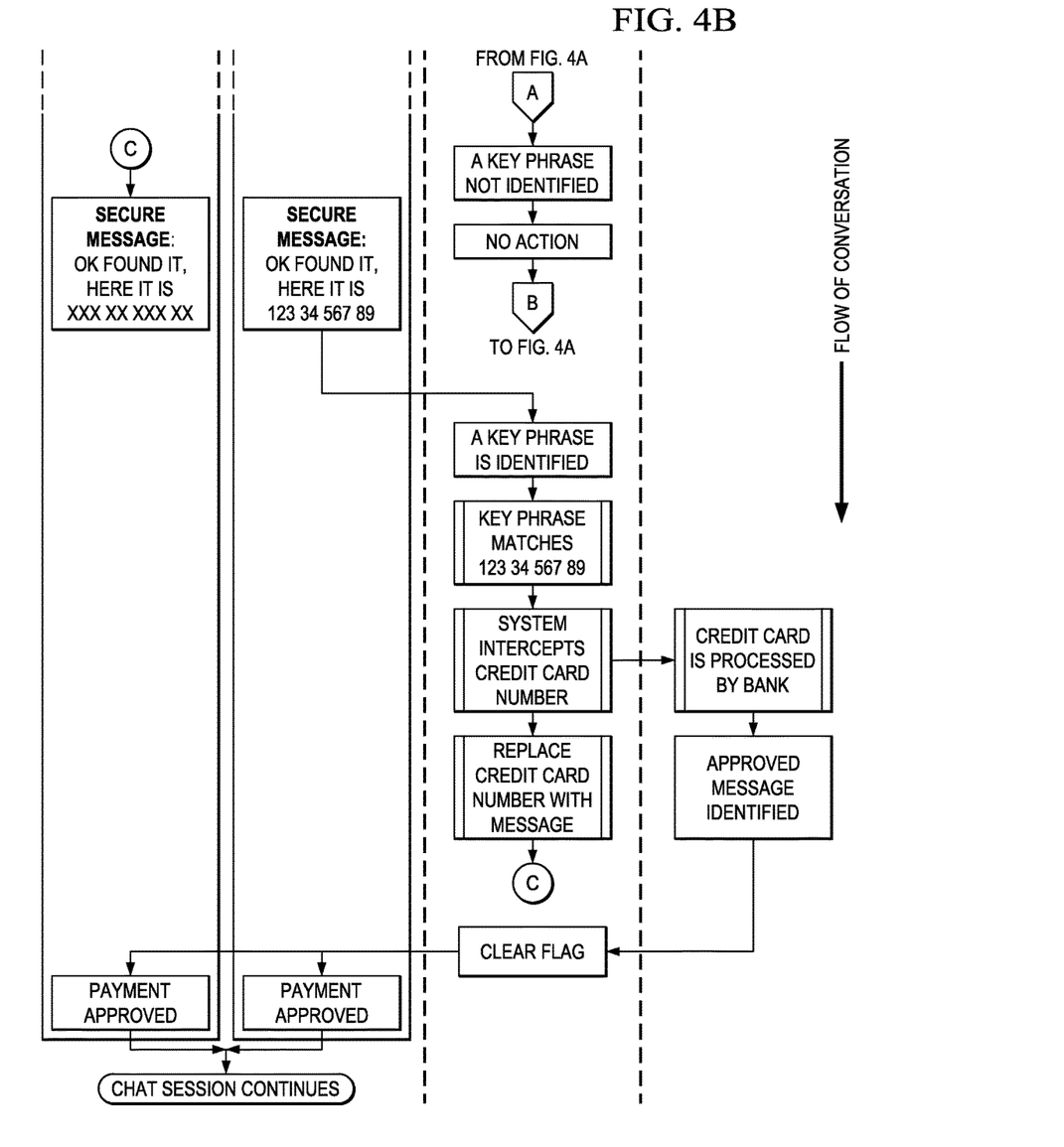
FIG. 4B is a simplified timing flow diagram illustrating potential operations that may be associated with the communication system in accordance with an embodiment.

Turning to FIGS. 4A and 4B, FIGS. 4A and 4B are an example timing flow diagram illustrating possible operations that may be associated with the protection of sensitive chat data, in accordance with an embodiment. In an embodiment, one or more operations of FIGS. 4A and 4B may be performed by security module 120, chat module 122, network chat module 130, and network security module 132. As illustrated in FIGS. 4A and 4B, a chat session begins at 148. During the chat session, a vendor may use user interface 126b to enter in the text "WOULD YOU LIKE TO PURCHASE THE WIDGET?" and the text appears in chat session 128b on display 118b. Network security module 132 can determine that the text does not include a key phase or a key phrase is not identified and decide that no action needs to be taken and the text "WOULD YOU LIKE TO PURCHASE THE WIDGET?" can be displayed in chat session 128c on display 118a.

In response to the question, a user may use user interface 126a to type "YES" and the text appears in chat session 128c. Network security module 132 can determine that the text does not include a key phase or a key phrase is not identified and decide that no action needs to be taken and the text "YES" can be displayed in chat session 128b on display 118b. In response, a vendor may use user interface 126b to enter the text "PLEASE ENTER YOUR CREDIT CARD NUMBER" and the text appears in chat session 128b on display 128b. Network security module 132 can determine that the text does includes a key phase or a key phrase is identified and network security module 132 can send a flag to electronic device 102 that sensitive data will be entered during chat session 128c.

In response to the text "PLEASE ENTER YOUR CREDIT CARD NUMBER", the user may use user interface 126a to type "SURE, HOLD A SECOND WHILE I LOOK FOR MY WALLET" and the text appears in chat session 128c on display 118a. Because electronic device 102 was sent a flag that sensitive data will be entered during chat session 128c, the text "SURE, HOLD A SECOND WHILE I LOOK FOR MY WALLET" can be displayed such that it is clear the message is a secure message. For example, a heading "SECURE MESSAGE:" may appear above the displayed text. Network security module 132 can determine that the text "SURE, HOLD A SECOND WHILE I LOOK FOR MY WALLET" does not include sensitive data or a key phase or sensitive data or a key phrase is not identified and decide that no action needs to be taken and the text "SURE, HOLD A SECOND WHILE I LOOK FOR MY WALLET" can be displayed in chat session 128b on display 118b.

The user may type in the text "OK FOUND IT, HERE IT IS 123 34 567 89" into user interface 126a and the text appears in chat session 128c. Because electronic device 102 was sent a flag that sensitive data will be entered during chat session 128c, the text can be displayed such that it is clear the message is a secure message. Network security module 132 can determine that the text does include sensitive data or a key phase or sensitive data or a key phrase is identified and that the sensitive data or key phrase matches a credit card number format. Network security module 132 can intercept the credit card number and securely communicate the credit card number to third party electronic device 110 (e.g., a bank) for processing. In addition, network security module can alter the text "OK FOUND IT, HERE IT IS 123 34 567 89" to protect the sensitive chat data such that the text "SECURE MESSAGE: OK FOUND IT, HERE IT IS XXX XX XXX XX" is displayed in chat session 128b on display 118b.

Third party electronic device 110 can processes the sensitive data (e.g., credit card data) and return a message to network security module 132 that the data has been processed (e.g., payment approved). Network security module 132 can receive the message from third party electronic device 110, and, because the sensitive data has been processed, send a message to electronic device 102 to clear the flag that indicates sensitive data will be entered during chat session 128a. In an example, the flag may not be cleared until the chat session ends. Network security module 132 can send a message that the payment has been approved and cause the text "PAYMENT APPROVED" to be displayed in both chat session 128b and 128c. The chat session can continue without breaking the continuity of the chat session.

Figure 5:
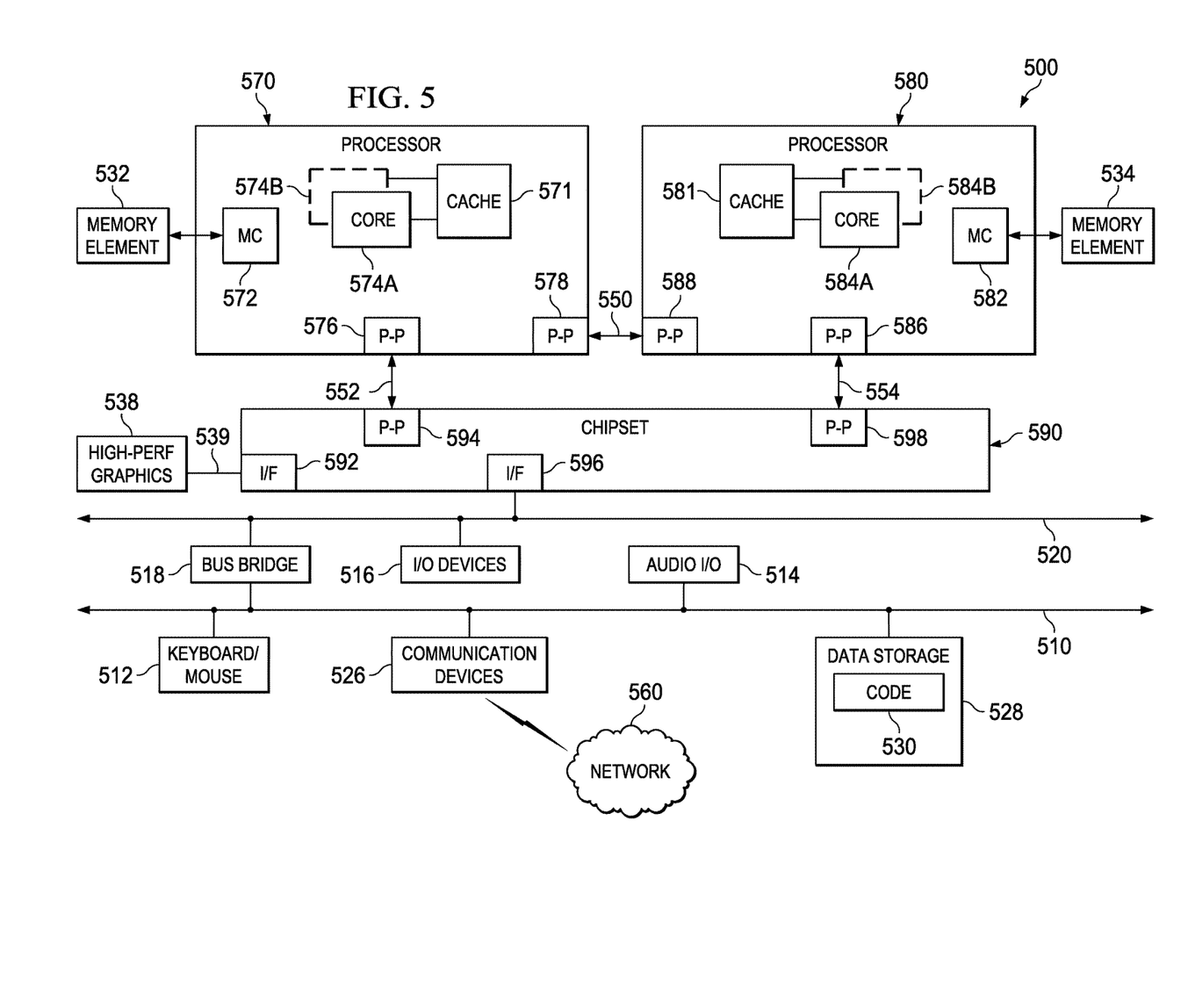
FIG. 5 is a block diagram illustrating an example computing system that is arranged in a point-to-point configuration in accordance with an embodiment.

FIG. 5 illustrates a computing system 500 that is arranged in a point-to-point (PtP) configuration according to an embodiment. In particular, FIG. 5 shows a system where processors, memory, and input/output devices are interconnected by a number of point-to-point interfaces. Generally, one or more of the network elements of communication system 100 may be configured in the same or similar manner as computing system 500.

As illustrated in FIG. 5, system 500 may include several processors, of which only two, processors 570 and 580, are shown for clarity. While two processors 570 and 580 are shown, it is to be understood that an embodiment of system 500 may also include only one such processor. Processors 570 and 580 may each include a set of cores (i.e., processor cores 574A and 574B and processor cores 584A and 584B) to execute multiple threads of a program. The cores may be configured to execute instruction code in a manner similar to that discussed above with reference to FIGS. 1-4. Each processor 570, 580 may include at least one shared cache 571, 581. Shared caches 571, 581 may store data (e.g., instructions) that are utilized by one or more components of processors 570, 580, such as processor cores 574 and 584.

Processors 570 and 580 may also each include integrated memory controller logic (MC) 572 and 582 to communicate with memory elements 532 and 534. Memory elements 532 and/or 534 may store various data used by processors 570 and 580. In alternative embodiments, memory controller logic 572 and 582 may be discreet logic separate from processors 570 and 580.

Processors 570 and 580 may be any type of processor and may exchange data via a point-to-point (PtP) interface 550 using point-to-point interface circuits 578 and 588, respectively. Processors 570 and 580 may each exchange data with a chipset 590 via individual point-to-point interfaces 552 and 554 using point-to-point interface circuits 576, 586, 594, and 598. Chipset 590 may also exchange data with a high-performance graphics circuit 538 via a high-performance graphics interface 539, using an interface circuit 592, which could be a PtP interface circuit. In alternative embodiments, any or all of the PtP links illustrated in FIG. 5 could be implemented as a multi-drop bus rather than a PtP link.

Chipset 590 may be in communication with a bus 520 via an interface circuit 596. Bus 520 may have one or more devices that communicate over it, such as a bus bridge 518 and I/O devices 516. Via a bus 510, bus bridge 518 may be in communication with other devices such as a keyboard/mouse 512 (or other input devices such as a touch screen, trackball, etc.), communication devices 526 (such as modems, network interface devices, or other types of communication devices that may communicate through a computer network 560), audio I/O devices 514, and/or a data storage device 528. Data storage device 528 may store code 530, which may be executed by processors 570 and/or 580. In alternative embodiments, any portions of the bus architectures could be implemented with one or more PtP links.

The computer system depicted in FIG. 5 is a schematic illustration of an embodiment of a computing system that may be utilized to implement various embodiments discussed herein. It will be appreciated that various components of the system depicted in FIG. 5 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 6:
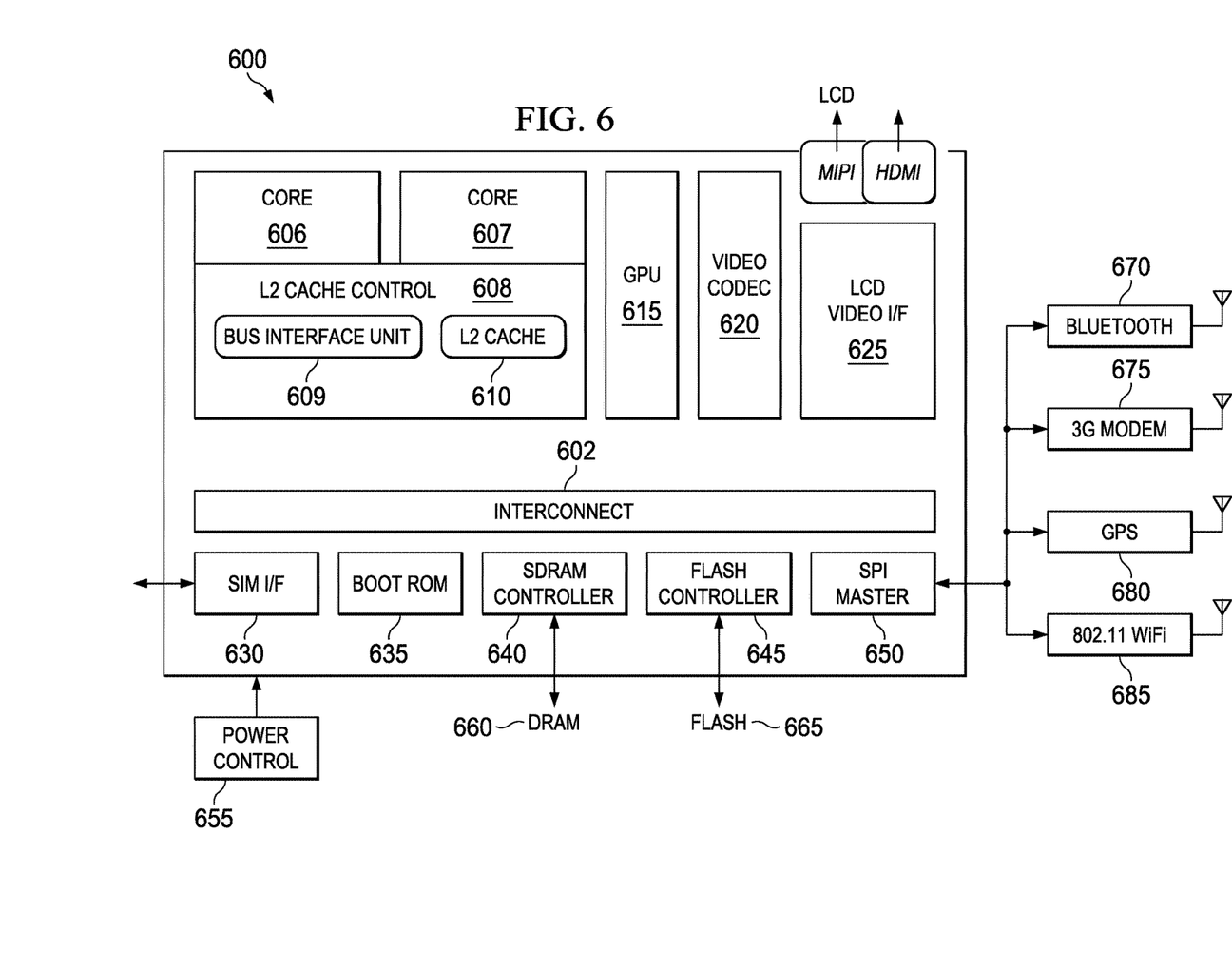
FIG. 6 is a simplified block diagram associated with an example ARM ecosystem system on chip (SOC) of the present disclosure.

Turning to FIG. 6, FIG. 6 is a simplified block diagram associated with an example ARM ecosystem SoC 600 of the present disclosure. At least one example implementation of the present disclosure can include the protection of sensitive chat data features discussed herein and an ARM component. For example, the example of FIG. 6 can be associated with any ARM core (e.g., A-9, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 6, ARM ecosystem SoC 600 may include multiple cores 606-607, an L2 cache control 608, a bus interface unit 609, an L2 cache 610, a graphics processing unit (GPU) 615, an interconnect 602, a video codec 620, and a liquid crystal display (LCD) I/F 625, which may be associated with mobile industry processor interface (MIPI)/high-definition multimedia interface (HDMI) links that couple to an LCD.

ARM ecosystem SoC 600 may also include a subscriber identity module (SIM) I/F 630, a boot read-only memory (ROM) 635, a synchronous dynamic random access memory (SDRAM) controller 640, a flash controller 645, a serial peripheral interface (SPI) master 650, a suitable power control 655, a dynamic RAM (DRAM) 660, and flash 665. In addition, one or more example embodiments include one or more communication capabilities, interfaces, and features such as instances of Bluetooth™ 670, a 3G modem 675, a global positioning system (GPS) 680, and an 802.11 Wi-Fi 685.

In operation, the example of FIG. 6 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 7:
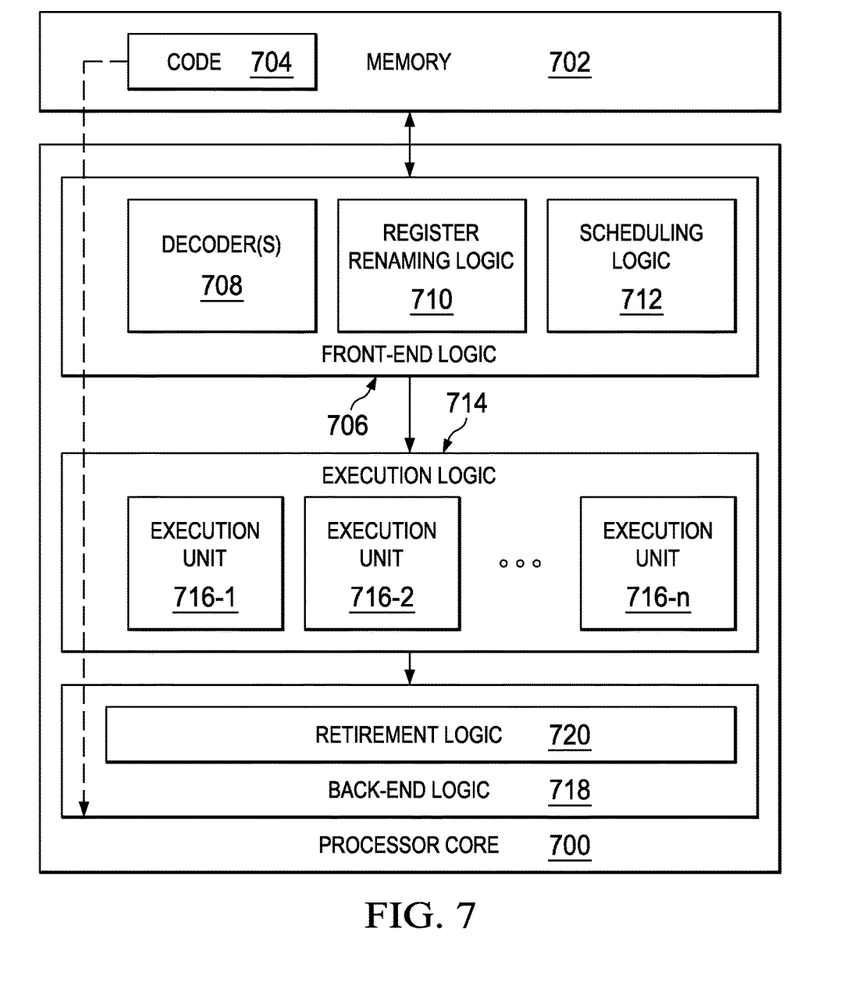
FIG. 7 is a block diagram illustrating an example processor core in accordance with an embodiment.

FIG. 7 illustrates a processor core 700 according to an embodiment. Processor core 700 may be the core for any type of processor, such as a micro-processor, an embedded processor, a digital signal processor (DSP), a network processor, or other device to execute code. Although only one processor core 700 is illustrated in FIG. 7, a processor may alternatively include more than one of the processor core 700 illustrated in FIG. 7. For example, processor core 700 represents one example embodiment of processors cores 574a, 574b, 574a, and 574b shown and described with reference to processors 570 and 580 of FIG. 5. Processor core 700 may be a single-threaded core or, for at least one embodiment, processor core 700 may be multithreaded in that it may include more than one hardware thread context (or "logical processor") per core.

FIG. 7 also illustrates a memory 702 coupled to processor core 700 in accordance with an embodiment. Memory 702 may be any of a wide variety of memories (including various layers of memory hierarchy) as are known or otherwise available to those of skill in the art. Memory 702 may include code 704, which may be one or more instructions, to be executed by processor core 700. Processor core 700 can follow a program sequence of instructions indicated by code 704. Each instruction enters a front-end logic 706 and is processed by one or more decoders 708. The decoder may generate, as its output, a micro operation such as a fixed width micro operation in a predefined format, or may generate other instructions, microinstructions, or control signals that reflect the original code instruction. Front-end logic 706 also includes register renaming logic 710 and scheduling logic 712, which generally allocate resources and queue the operation corresponding to the instruction for execution.

Processor core 700 can also include execution logic 714 having a set of execution units 716-1 through 716-N. Some embodiments may include a number of execution units dedicated to specific functions or sets of functions. Other embodiments may include only one execution unit or one execution unit that can perform a particular function. Execution logic 714 performs the operations specified by code instructions.

After completion of execution of the operations specified by the code instructions, back-end logic 718 can retire the instructions of code 704. In one embodiment, processor core 700 allows out of order execution but requires in order retirement of instructions. Retirement logic 720 may take a variety of known forms (e.g., re-order buffers or the like). In this manner, processor core 700 is transformed during execution of code 704, at least in terms of the output generated by the decoder, hardware registers and tables utilized by register renaming logic 710, and any registers (not shown) modified by execution logic 714.

Although not illustrated in FIG. 7, a processor may include other elements on a chip with processor core 700, at least some of which were shown and described herein with reference to FIG. 5. For example, as shown in FIG. 5, a processor may include memory control logic along with processor core 700. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 and their teachings are readily scalable and can accommodate a large number of components, as well as more complicated/sophisticated arrangements and configurations. Accordingly, the examples provided should not limit the scope or inhibit the broad teachings of communication systems 100a and 100b as potentially applied to a myriad of other architectures.

It is also important to note that the operations in the preceding flow diagrams (i.e., FIGS. 2-4) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 have been illustrated with reference to particular elements and operations that facilitate the communication process, these elements and operations may be replaced by any suitable architecture, protocols, and/or processes that achieve the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example C1 is at least one machine readable medium having one or more instructions that when executed by at least one processor, cause the at least processor to communicate chat session data during a chat session to a first display of a first electronic device, communicate the chat session data during the chat session to a second display of a second electronic device, receive sensitive data during the chat session from the first electronic device, and protect the sensitive data from being displayed on the second display during the chat session without breaking continuity of the chat session.

In Example C2, the subject matter of Example C1 can optionally include where the one or more instructions that when executed by the at least one processor, further cause the processor to encrypt the sensitive chat data before being displayed on the second electronic device.

In Example C3, the subject matter of any one of Examples C1-C2 can optionally include where the one or more instructions that when executed by the at least one processor, further cause the processor to redirect the sensitive chat data to a secure system for processing.

In Example C4, the subject matter of any one of Examples C1-C3 can optionally include where the one or more instructions that when executed by the at least one processor, further cause the processor to identify the sensitive data as protected on the first display.

In Example C5, the subject matter of any one of Examples C1-C4 can optionally include where wherein the sensitive data is credit card information.

In Example A1, an electronic device can include a network chat module, where the network chat module is configured to communicate chat session data during a chat session to a first display of a first electronic device, communicate the chat session data during the chat session to a second display of a second electronic device, receive sensitive data during the chat session from the first electronic device, and protect the sensitive data from being displayed on the second display during the chat session without breaking continuity of the chat session.

In Example, A2, the subject matter of Example A1 can optionally include where the network chat module is further configured to encrypt the sensitive chat data before being displayed on the second electronic device.

In Example A3, the subject matter of any one of Examples A1-A2 can optionally include where the network chat module is further configured to redirect the sensitive chat data to a secure system for processing.

In Example A4, the subject matter of any one of Examples A1-A3 can optionally include where the network chat module is further configured to identify the sensitive data as protected on the first display.

In Example A5, the subject matter of any one of Examples A1-A4 can optionally include where the sensitive data is credit card information.

Example M1 is a method including communicating chat session data during a chat session to a first display of a first electronic device, communicating the chat session data during the chat session to a second display of a second electronic device, receiving sensitive data during the chat session from the first electronic device, and protecting the sensitive data from being displayed on the second display during the chat session without breaking continuity of the chat session.

In Example M2, the subject matter of Example M1 can optionally include encrypting the sensitive chat data before being displayed on the second electronic device.

In Example M3, the subject matter of any one of the Examples M1-M2 can optionally include redirecting the sensitive chat data to a secure system for processing.

In Example M4, the subject matter of any one of the Examples M1-M3 can optionally include identifying the sensitive data as protected on the first display.

In Example M5, the subject matter of any one of the Examples M1-M4 can optionally include where the sensitive data is credit card information.

In Example M6, the subject matter of any one of the Examples M1-M5 can optionally include where a filter driver controls input and output access to the virtualized protected area of memory.

Example S1 is a system for protecting sensitive chat data during a chat session, the system including a network chat module configured to communicate chat session data during a chat session to a first display of a first electronic device, communicate the chat session data during the chat session to a second display of a second electronic device, receive sensitive data during the chat session from the first electronic device, and protect the sensitive data from being displayed on the second display during the chat session without breaking continuity of the chat session.

In Example S2, the subject matter of Example S1 can optionally include where system is further configured to encrypt the sensitive chat data before being displayed on the second electronic device.

In Example S3, the subject matter of any one of the Examples S1-S2 can optionally include where the system is further configured to redirect the sensitive chat data to a secure system for processing.

In Example S4, the subject matter of any one of the Examples S1-S3 can optionally include where the system is further configured to identify the sensitive data as protected on the first display.

In Example S5, the subject matter of any one of the Examples S1-S4 can optionally include where the sensitive data is credit card information.

Example X1 is a machine-readable storage medium including machine-readable instructions to implement a method or realize an apparatus as in any one of the Examples A1-A5, or M1-M6. Example Y1 is an apparatus comprising means for performing of any of the Example methods M1-M6. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory machine-readable medium comprising one or more instructions that when executed by a processor, cause the processor to:
    communicate chat session data during a chat session to a first display of a first electronic device, wherein the chat session data includes non-sensitive text;
    communicate the chat session data during the chat session to a second display of a second electronic device;
    determine whether the non-sensitive text entered during the chat session indicates that sensitive data will be entered during the chat session;
    monitor, in response to determining that the non-sensitive text indicates that sensitive data will be entered, the chat session data for sensitive data during the chat session;
    receive sensitive data during the chat session from the first electronic device;
    protect the sensitive data from being displayed on the second display during the chat session without breaking the flow of chat data being displayed; and
    intercept and securely communicate the sensitive data received during the chat session to a third party electronic device without breaking the continuity of the chat session.

2. The at least one non-transitory machine-readable medium of claim 1, further comprising one or more instructions that when executed by the processor, cause the processor to:
    encrypt the sensitive data before being displayed on the second electronic device.

3. The at least one non-transitory machine-readable medium of claim 1, wherein the sensitive data is communicated to the third party electronic device for processing a payment for an online purchase.

4. The at least one non-transitory machine-readable medium of claim 1, further comprising one or more instructions that when executed by the processor, cause the processor to:
    identify the sensitive data as protected on the first display.

5. The at least one non-transitory machine-readable medium of claim 1, wherein the sensitive data is credit card information.

6. An apparatus comprising:
    a network chat module including a processor, and a memory storing executable instructions that when executed by the processor cause the network chat module to be configured to:
    communicate chat session data during a chat session to a first display of a first electronic device, wherein the chat session data includes non-sensitive text;
    communicate the chat session data during the chat session to a second display of a second electronic device;
    determine whether the non-sensitive text entered during the chat session indicates that sensitive data will be entered during the chat session;
    monitor, in response to determining that the non-sensitive text entered during the chat session indicates that sensitive data will be entered, the chat session data for sensitive data during the chat session;
    receive sensitive data during the chat session from the first electronic device;
    protect the sensitive data from being displayed on the second display during the chat session without breaking the flow of chat data being displayed; and
    intercept and securely communicate the sensitive data received during the chat session to a third party electronic device without breaking the continuity of the chat session.

7. The apparatus of claim 6, wherein the network chat module is further configured to:
    encrypt the sensitive data before being displayed on the second electronic device.

8. The apparatus of claim 6, wherein the sensitive data is communicated to the third party electronic device for processing a payment for an online purchase.

9. The apparatus of claim 6, wherein the network chat module is further configured to:
    identify the sensitive data as protected on the first display.

10. The apparatus of claim 6, wherein the sensitive data is credit card information.

11. A method comprising:

communicating chat session data during a chat session to a first display of a first electronic device, wherein the chat session data includes non-sensitive text;

communicating the chat session data during the chat session to a second display of a second electronic device;

determining whether the non-sensitive text entered during the chat session indicates that sensitive data will be entered during the chat session;

monitoring, in response to determining that the non-sensitive text entered during the chat session indicates that sensitive data will be entered, the chat session data for sensitive data during the chat session;

receiving sensitive data during the chat session from the first electronic device;

protecting the sensitive data from being displayed on the second display during the chat session without breaking the flow of chat data being displayed; and intercept and securely communicate the sensitive data received during the chat session to a third party electronic device without breaking the continuity of the chat session.

12. The method of claim 11, further comprising:

encrypting the sensitive data before being displayed on the second electronic device.

13. The method of claim 11, wherein the sensitive data is communicated to the third party electronic device for processing a payment for an online purchase.

14. The method of claim 11, further comprising:

identifying the sensitive data as protected on the first display.

15. The method of claim 11, wherein the sensitive data is credit card information.

16. A system for protecting sensitive chat data during a chat session, the system comprising:

a network chat module configured to:

communicate chat session data during a chat session to a first display of a first electronic device, wherein the chat session data includes non-sensitive text;

communicate the chat session data during the chat session to a second display of a second electronic device;

determine whether the non-sensitive text entered during the chat session indicates that sensitive data will be entered during the chat session;

monitor, in response to determining that the non-sensitive text entered during the chat session indicates that sensitive data will be entered, the chat session data for sensitive data during the chat session;

receive sensitive data during the chat session from the first electronic device;

protect the sensitive data from being displayed on the second display during the chat session without breaking the flow of chat data being displayed; and intercept and securely communicate the sensitive data received during the chat session to a third party electronic device without breaking the continuity of the chat session.

17. The system of claim 16, wherein the system is further configured to:

encrypt the sensitive data before being displayed on the second electronic device.

18. The system of claim 16, wherein the sensitive data is communicated to the third party electronic device for processing a payment for an online purchase.

19. The system of claim 16, wherein the system is further configured to:

identify the sensitive data as protected on the first display.

20. The system of claim 16, wherein the sensitive data is credit card information.

* * * * *

UNITED STATES PATENT AND TRADEMARK OFFICE
CERTIFICATE OF CORRECTION

PATENT NO. : 10,834,027 B2
APPLICATION NO. : 14/752870
DATED : November 10, 2020
INVENTOR(S) : Robert L. Vaughn et al.

Page 1 of 1

It is certified that error appears in the above-identified patent and that said Letters Patent is hereby corrected as shown below:

On the Title Page

In Column 1, Applicant, delete "Plano, TX (US)" and insert -- San Jose, CA (US) --, therefor.

Signed and Sealed this
Nineteenth Day of January, 2021

Andrei Iancu
*Director of the United States Patent and Trademark Office*